United States Patent

Kobayashi

Patent Number: 5,442,083
Date of Patent: Aug. 15, 1995

[54] METHOD FOR THE PREPARATION OF ORGANOSILICON POLYMER

[75] Inventor: Hideki Kobayashi, Chiba, Japan

[73] Assignee: Dow Corning Toray Silicone Company, Ltd., Tokyo, Japan

[21] Appl. No.: 296,060

[22] Filed: Aug. 24, 1994

[30] Foreign Application Priority Data

Sep. 3, 1993 [JP] Japan .................. 5-243843

[51] Int. Cl.$^6$ ............................. C07F 7/08
[52] U.S. Cl. .............................. 556/434
[58] Field of Search ...................... 556/434

[56] References Cited

U.S. PATENT DOCUMENTS

| | | | |
|---|---|---|---|
| 5,087,720 | 2/1992 | Kishita et al. | 556/434 |
| 5,117,025 | 5/1992 | Takago | 556/434 |
| 5,196,558 | 3/1993 | Inomata et al. | 556/434 |
| 5,262,506 | 11/1993 | Okawa et al. | 556/434 X |
| 5,272,243 | 12/1993 | Nakashima et al. | 556/434 X |
| 5,310,846 | 5/1994 | Inomata et al. | 556/434 X |

OTHER PUBLICATIONS

Izvestiya Akademii Nauk SSSR, Seriya Khimicheskaya, No. 4, pp. 739–744, Apr. 1971.
Zhurnal Obshchoi Khimii, vol. 30, No. 3, pp. 838–845, Mar. 1960, V. M. Vdovin, A. D. Petrov.
Chemistry and Technology of Silicones, Journal of the American Chemical Society, vol. 78, 1986 (1956).

*Primary Examiner*—Paul F. Shaver
*Attorney, Agent, or Firm*—Alexander Weitz

[57] ABSTRACT

There is disclosed a method for the preparation of an organosilicon polymer having the structure

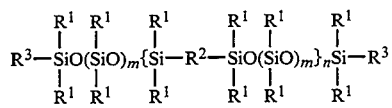

wherein each $R^1$ is a monovalent hydrocarbon group, $R^2$ is an alkylene group, $R^3$ is selected from hydrogen, an alkenyl group or a hydroxyl group, m is zero or greater and n is 1 or more, said method comprising:

reacting (A) diorganosiloxane having the general formula

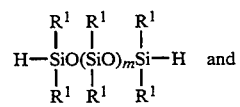

(B) an unsaturated aliphatic hydrocarbon having 3 to 10 carbon atoms that contains 2 carbon-carbon double bonds and an unsaturated aliphatic hydrocarbon having 2 to 10 carbon atoms that contains 1 carbon-carbon triple bond, said reaction taking place in the presence of (C) a hydrosilylation-reaction catalyst.

15 Claims, No Drawings

METHOD FOR THE PREPARATION OF ORGANOSILICON POLYMER

FIELD OF THE INVENTION

The present invention relates to a method for the preparation of an organosilicon polymer that contains the silalkylenesiloxane unit. More specifically, the present invention relates to a method for the preparation of silalkylenesiloxane unit-containing organosilicon polymer that is free of depolymerization and thus affords high yields.

BACKGROUND OF THE INVENTION

Because organosilicon polymers that contain the silalkylenesiloxane unit with the general formula

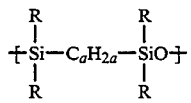

in which
R = monovalent hydrocarbon group
a = positive integer
are less susceptible to molecular chain scission by ionic substances (e.g., acids, alkalis, and so forth) than are diorganopolysiloxanes, such silalkylenesiloxane unit-containing organosilicon polymers are currently under investigation for utilization in various specialized applications. The ring-opening polymerization of cyclic silalkylenesiloxane is known for the synthesis of said silalkylenesiloxane unit-containing organosilicon polymers (refer to Japanese Laid Open Patent Application Numbers Hei 4-65428 and Hei 4-65429 and Izvestiya Akademii Nauk SSSR, Seriya Khimicheskaya, No. 4, 739–744, April, 1971).

The method for synthesizing this organosilicon polymer that is taught in Japanese Laid Open Patent Application Numbers Hei 4-65428 and Hei 4-65429 and in the article in Izvestiya Akademii Nauk SSSR requires the preliminary synthesis of a cyclic silalkylenesiloxane such as 2,2,6,6-tetramethyl-1-oxa-2,6-disilacyclohexane. However, these cyclic silalkylenesiloxanes are typically themselves quite difficult to synthesize. Moreover, as reported in the article in Izvestiya Akademii Nauk SSSR, a partial depolymerization of the polysilalkylenesiloxane occurs in this method, which leads to a substantial reduction in the yield of the organosilicon polymer.

SUMMARY OF THE INVENTION

The present invention takes as its object the introduction of a method for the preparation of a silalkylenesiloxane unit-containing organosilicon polymer that is free of depolymerization and thus affords high yields.

The present invention relates to a method for the preparation of an organosilicon polymer having the general formula

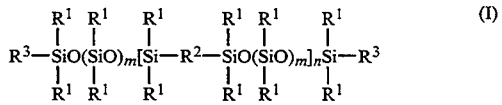

wherein $R^1$ denotes a $C_1$-$C_{10}$ monovalent hydrocarbon group that is free of aliphatic unsaturation; $R^2$ denotes a $C_2$-$C_{10}$ alkylene group; $R^3$ is a hydrogen atom, a $C_2$-$C_{10}$ alkenyl group, or hydroxyl group; m is an integer having a value of zero or greater; and n is a positive integer, said method being characterized by the execution of an addition polymerization step between (A) a diorganosiloxane of the general formula

wherein $R^1$ denotes a $C_1$-$C_{10}$ monovalent hydrocarbon group that is free of aliphatic unsaturation and m is an integer having a value of zero or greater and (B) a $C_3$-$C_{10}$ unsaturated aliphatic hydrocarbon that contains 2 carbon-carbon double bonds or a $C_2$-$C_{10}$ unsaturated aliphatic hydrocarbon that contains 1 carbon-carbon triple bond in the presence of (C) a hydrosilylation-reaction catalyst.

DETAILED DESCRIPTION OF THE INVENTION

The diorganosiloxane (A) is the component that introduces the diorganosiloxane unit into the organosilicon polymer, and has the general formula

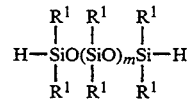

$R^1$ in this formula denotes $C_1$-$C_{10}$ monovalent hydrocarbon groups that are free of aliphatic unsaturation. $R^1$ is specifically exemplified by alkyl groups such as methyl, ethyl, propyl, butyl, pentyl, hexyl, heptyl, octyl, nonyl, and decyl; aryl groups such as phenyl, tolyl, and xylyl; and aralkyl groups such as benzyl and phenethyl. Methyl and phenyl are preferred for $R^1$. The subscript m in the preceding formula is an integer with a value of zero or greater, and the diorganosiloxane comprising component (A) may consist of a mixture of diorganosiloxanes having several values for m. Component (A) takes the form of 1,1,3,3-tetraorganodisiloxane when it consists of only diorganosiloxane having m=0. While the upper limit on m is not specifically restricted, the use of diorganosiloxane having m>100 makes it very difficult to separate unreacted component (A) from the organosilicon polymer product. For this reason, m is preferably an integer in the range of zero to 100.

Component (A) is specifically exemplified by the following diorganosiloxanes and by mixtures obtained therefrom, wherein $C_6H_5$ hereinafter represents a phenyl radical.

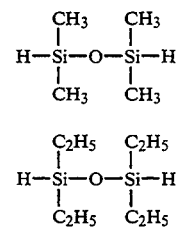

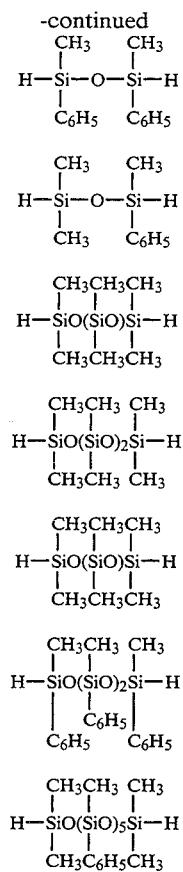

Component (B) is a $C_3$-$C_{10}$ unsaturated aliphatic hydrocarbon that contains 2 carbon-carbon double bonds or a $C_2$-$C_{10}$ unsaturated aliphatic hydrocarbon that contains 1 carbon-carbon triple bond. It is this component that introduces the alkylene group into the organosilicon polymer. The former type of component (B) is exemplified by 1,2-propadiene (common name: allene), 1,3-butadiene, 2-methyl-1,3-butadiene (common name: isoprene), 2,3-dimethyl-1,3-butadiene, 1,3-pentadiene, 1,4-pentadiene, 1,5-hexadiene, and 1,3-cyclohexadiene. The latter type of component (B) is exemplified by acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, and 5-decyne. When $R^2$ in above recited formula (I) is to contain only 2 carbon atoms, component (B) is acetylene.

No specific restriction applies to the quantity of addition of component (B) in the preparative method of the invention. However, the component (A)/component (B) molar ratio preferably falls in the range of 0.5:1.0 to 1.5:1.0. In order to synthesize organosilicon polymer with a relatively high molecular weight, the component (A)/component (B) molar ratio is preferably precisely 1:1.

The hydrosilylation-reaction catalyst (C) accelerates the addition reaction in the preparative method of the invention between the silicon-bonded hydrogen atoms in component (A) and the aliphatically unsaturated carbon-carbon bonds in component (B) and thereby catalyzes the synthesis of the organosilicon polymer by accelerating addition polymerization. No specific restrictions apply to component (C), and it is exemplified by platinum catalysts, rhodium catalysts, palladium catalysts, and organoperoxides. Platinum catalysts are preferred for their ability to provide a substantial acceleration of the addition polymerization. Preferred platinum catalysts are specifically exemplified by platinum black, platinum supported on silica micropowder, platinum supported on carbon powder, chloroplatinic acid, alcohol solutions of chloroplatinic acid, platinumvinylsiloxane complexes, and platinum-olefin complexes. The addition of component (C) in the preparative method of the invention is not specifically restricted as long as a catalytic quantity is added. The preferred range of component (C) addition is 0.1 to 500 weight parts (as Pt metal) per 1,000,000 weight parts for the total of components (A) and (B).

The characteristic feature of the preparative method of the invention is the execution of an addition polymerization between components (A) and (B) in the presence of component (C). The sequence of addition of components (A), (B), and (C) in the preparative method of the present invention is not critical. For example, component (B) may be gradually added to the stirred and heated mixture of components (A) and (C); component (A) may be gradually added to the stirred and heated mixture of components (B) and (C); component (C) may be gradually added to the stirred and heated mixture of components (A) and (B); the mixture of components (A), (B), and (C) may be stirred and heated; or, when component (B) is a gas, gaseous component (B) may be introduced into the mixture of components (A) and (C).

Organic solvent can be used in the preparative method of the present invention insofar as the object of the invention is not impaired. The use of organic solvent makes possible the synthesis of organosilicon polymers with higher molecular weights by the preparative method of the invention. Organic solvents usable in the preparative method of the invention are specifically exemplified by aromatic hydrocarbon solvents such as toluene, and xylene; aliphatic hydrocarbon solvents such as hexane, heptane, octane, and nonane; alicyclic hydrocarbon solvents such as cyclohexane, cycloheptane, and cyclooctane; and fluorine-containing aromatic hydrocarbon solvents such as trifluoromethylbenzene, 1,3-bis(trifluoromethyl)benzene, and methylpentafluorobenzene The preparative conditions in the present invention are not specifically restricted in scope. When the addition polymerization is run at ambient pressure, the reaction temperature may range from room temperature to the boiling point of component (A) or (B) or the boiling point of any organic solvent used. The addition polymerization can also be run under pressure when the boiling points of components (A) and (B) and the (optional) organic solvent are relatively low.

The organosilicon polymer prepared as described above has the following general formula.

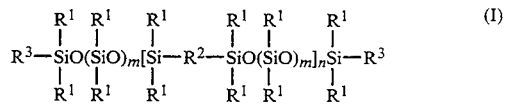

wherein $R^1$ represents $C_1$-$C_{10}$ monovalent hydrocarbon groups that are free of aliphatic unsaturation, as set forth above. $R^2$ in the preceding formula encompasses linear and branched $C_2$-$C_{10}$ alkylene groups, and $R^2$ is specifically exemplified by ethylene, methylethylene, ethylethylene, propylethylene, butylethylene, propylene, butylene, 1-methylpropylene, pentylene, hexylene, heptylene, octylene, nonylene, and decylene. $R^2$ is preferably ethylene, propylene, butylene, or hexylene. $R^3$ in the preceding formula denotes the hydrogen atom, hydroxyl group, or a $C_2$-$C_{10}$ alkenyl group. The alkenyl groups encompassed by $R^3$ are specifically exemplified by vinyl, allyl, butenyl, pentenyl, hexenyl, heptenyl, octenyl, nonenyl, and decenyl. When component (A) is added in excess relative to component (B) in the preparative method of the present invention, silicon-bonded hydrogen will be present at the molecular chain terminals of the resulting organosilicon polymer. The addition of component (B) in excess relative to component (A) results in alkenyl at the molecular chain terminals of the resulting organosilicon polymer. When an optional compound (D) containing active hydrogen, such as water, alcohols, etc., is introduced into the reaction system in the preparative method of the present invention, the hydroxyl group will be present at the molecular chain terminals of the resulting organosilicon polymer. The subscript m in the preceding formula indicates the degree of polymerization for the diorganosiloxane unit, and it is an integer with a value of zero or greater. The subscript n in the preceding formula indicates the degree of polymerization for the silalkylenesiloxane unit, and it is a positive integer. The organosilicon polymer afforded by the preparative method of the present invention will be a polysilalkylenesiloxane when m=0. When m=1, the preparative method of the present invention yields a silalkylenesiloxanediorganosiloxane copolymer.

The organosilicon polymers prepared as described above are viscous liquids at room temperature and have low surface tensions. Moreover, the molecular chain of these organosilicon polymers is resistant to scission by ionic substances such as acids, alkalis, and so forth. These properties make possible the application of the subject organosilicon polymers as an oil, e.g., as the base oil for lubricants, antifoams, greases, and so forth, but also support their application as the base polymer in organoperoxide-curing silicone rubber compositions, addition reaction-curing silicone rubber compositions, and condensation reaction-curing silicone rubber compositions. Furthermore, these organosilicon polymers can be used as starting material for the preparation of organofunctional group-endblocked organosilicon polymer based on their addition reaction with organofunctionalized alkenes (when silicon-bonded hydrogen is present at their molecular chain terminals) or with organofunctionalized hydrogensilanes (when alkenyl is present at their molecular chain terminals). The organosilicon polymers carrying hydroxyl at the molecular chain terminals can be used as starting material for the preparation of organofunctional group-endblocked organosilicon polymer through their reaction with an organofunctionalized halosilane or silazane.

EXAMPLES

The method of the present invention for the preparation of organosilicon polymer will be explained in greater detail through working examples. The viscosity values reported in the examples were measured at 25° C.

EXAMPLE 1

A reactor was charged with 26.8 g (0.2 mol) of 1,1,3,3-tetramethyldisiloxane, 16.1 g (0.196 mol) of 1,5-hexadiene, and 60 g of toluene, this mixture was stirred to homogeneity in a reactor, and 1 g 0.5% of Pt supported on carbon powder was subsequently added. The reaction system was slowly heated and then heated under reflux for 1 hour at 112° C. The reaction system was thereafter cooled, the Pt/carbon powder was removed by decanting, and the solvent was distilled from the solution to afford a viscous liquid. This viscous liquid was confirmed to be polysilhexylenedimethylsiloxane with the following formula through analysis by $^1$H-nuclear magnetic resonance spectroscopic analysis (NMR) and infrared spectroscopic analysis (IR).

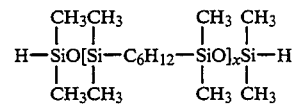

in which x is an integer with a value $\geq 1$.

This polysilhexylenedimethylsiloxane was determined to have a weight-average molecular weight of 8,000 by analysis by gel permeation chromatography (GPC) calibrated with polydimethylsiloxane. A polysilhexylenedimethylsiloxane yield of 94% was determined from the peak area.

EXAMPLE 2

The following were introduced into a reactor and slowly heated to 50° C. while stirring: 26 g (0.194 mol) of 1,1,3,3-tetramethyldisiloxane, 50 g of toluene, and 1 g of 0.5% Pt supported on carbon powder. A mixture of 16.4 g (0.2 mol) of 1,5-hexadiene and 15 g toluene was slowly dripped into the system at 50° C. to 90° C. The system was thereafter heated under reflux for 1 hour at 112° C. The reaction system was subsequently cooled, the Pt/carbon powder was removed by decanting, and the solvent was distilled from the toluene solution to afford a viscous liquid. This viscous liquid was confirmed to be polysilhexylenedimethylsiloxane with the following formula through analysis by $^1$H-NMR and IR.

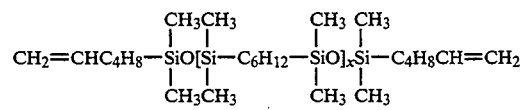

in which x is an integer with a value $\geq 1$.

This polysilhexylenedimethylsiloxane was determined to have a weight-average molecular weight of 7,000 by analysis by GPC calibrated with polydimethylsiloxane. A polysilhexylenedimethylsiloxane yield of 95% was determined from the peak area.

EXAMPLE 3

The following were introduced into a reactor and heated to 50° C. while stirring to homogeneity: 26.4 g (0.2 mol) of 1,1,3,3-tetramethyldisiloxane, 50 g of 1,3-bis(trifluoromethyl)benzene, and sufficient 10% isopropanolic chloroplatinic acid solution to provide 60 ppm platinum metal in the system. Gaseous acetylene was then fed into the system for 3 hours while stirring. During this interval the system evolved heat to reach 100° C. and an increase in the viscosity of the system was observed. The 1,3-bis(trifluoromethyl)benzene was thereafter distilled off to yield a viscous liquid. This viscous liquid was confirmed to be polysilethylenedimethylsiloxane with the following formula through analysis by $^1$H-NMR and IR.

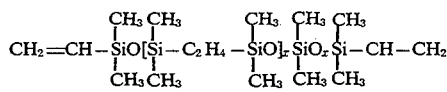

in which x is an integer with a value ≧ 1.

This polysilethylenedimethylsiloxane was determined to have a weight-average molecular weight of 5,000 by analysis by GPC calibrated with polydimethylsiloxane. A polysilethylenedimethylsiloxane yield of 93% was determined from the peak area.

EXAMPLE 4

The following were introduced into a reactor and slowly heated to 50° C. while stirring: 32.7 g (0.2 mol) of a diorganosiloxane mixture defined having the following average formula

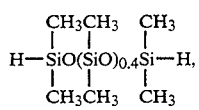

50 g of toluene, and 1 g of 0.5% Pt supported on carbon powder. A mixture of 16.4 g (0.2 mol) of 1,5-hexadiene and 15 g of toluene was slowly dripped into the system at 50° C. to 90° C. The system was thereafter heated under reflux for 1 hour at 112° C. The reaction system was subsequently cooled, the Pt/carbon powder was removed by decanting, and the toluene was distilled from the solution to afford a viscous liquid. This viscous liquid was confirmed through analysis by $^1$H-NMR and IR to be a silhexylenesiloxane-dimethylsiloxane copolymer mixture with the following average formula.

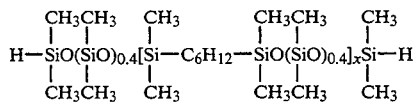

in which x is an integer with a value ≧ 1.

This silhexylenesiloxane-dimethylsiloxane copolymer mixture was determined to have a weight-average molecular weight of 10,000 by analysis by GPC calibrated with polydimethylsiloxane. A silhexylenesiloxane-dimethylsiloxane copolymer mixture yield of 95% was determined from the peak area.

I claim:

1. A method for the preparation of an organosilicon polymer having the structure

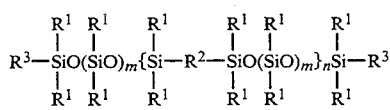

wherein each $R^1$ denotes a monovalent hydrocarbon group which is free of aliphatic unsaturation and contains 1 to 10 carbon atoms, $R^2$ denotes an alkylene group having 2 to 10 carbon atoms, $R^3$ is a group selected from the group consisting of hydrogen, an alkenyl group having 2 to 10 carbon atoms and a hydroxyl group, m is an integer having a value of zero or greater and n is an integer having a value of 1 or more, said method comprising:
reacting
(A) diorganosiloxane having the general formula

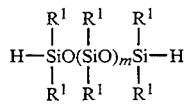

wherein $R^1$ and m have their previously defined meanings, and (B) an unsaturated aliphatic hydrocarbon having 3 to 10 carbon atoms that contains 2 carbon-carbon double bonds, said reaction taking place in the presence of (C) a hydrosilylation-reaction catalyst, with the proviso that said reaction takes place in the presence of an active hydrogen-containing compound when $R^3$ is to be said hydroxyl group.

2. The method according to claim 1, wherein $R^1$ is selected from the group consisting of methyl radical and phenyl radical.

3. The method according to claim 2, wherein said unsaturated compound (B) is selected from the group consisting of 1,2-propadiene, 1,3-butadiene, 2-methyl-1,3-butadiene, 2,3-dimethyl-1,3-butadiene, 1,3-pentadiene, 1,4-pentadiene, 1,5-hexadiene and 1,3-cyclohexadiene.

4. A method for the preparation of an organosilicon polymer having the structure

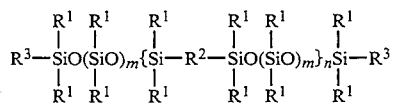

wherein each $R^1$ denotes a monovalent hydrocarbon group which is free of aliphatic unsaturation and contains 1 to 10 carbon atoms, $R^2$ denotes an alkylene group having 2 to 10 carbon atoms, $R^3$ is a group selected from the group consisting of hydrogen, an alkenyl group having 2 to 10 carbon atoms and a hydroxyl group, m is an integer having a value of zero or greater and n is an integer having a value of 1 or more, said method comprising:
reacting
(A) diorganosiloxane having the general formula

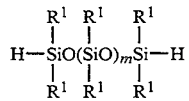

wherein $R^1$ and m have their previously defined meanings, and (B) an unsaturated aliphatic hydrocarbon having 2 to 10 carbon atoms that contains 1 carbon-carbon triple bond, said reaction taking place in the presence of (C) a hydrosilylation-reaction catalyst, with the proviso that said unsaturated compound (B) is acetylene when $R^2$ is to have 2 carbon atoms and said reaction takes place in the presence of an active hydrogen-containing compound when $R^3$ is to be said hydroxyl group.

5. The method according to claim 4, wherein $R^1$ is selected from the group consisting of methyl radical and phenyl radical.

6. The method according to claim 5, wherein said unsaturated compound (B) is selected from the group consisting of acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne and 5-decyne.

7. The method according to claim 1, wherein said diorganosiloxane (A) is selected from the group consisting of compounds represented by the structures

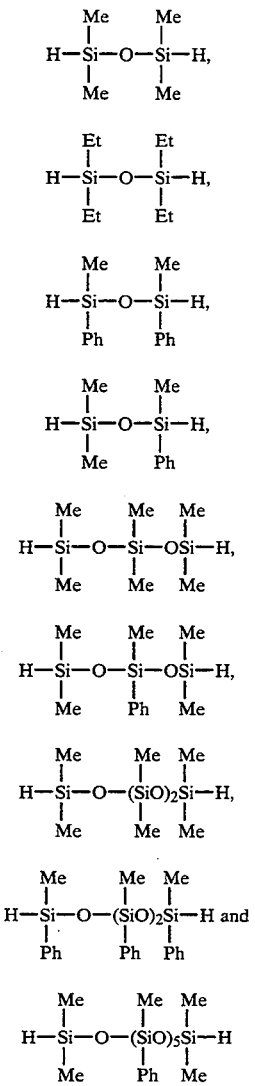

wherein Me and Ph represent methyl and phenyl radicals, respectively.

8. The method according to claim 7, wherein said unsaturated compound (B) is selected from the group consisting of 1,2-propadiene, 1,3-butadiene, 2-methyl-1,3-butadiene, 2,3-dimethyl-1,3-butadiene, 1,3-pentadiene, 1,4-pentadiene, 1,5-hexadiene and 1,3-cyclohexadiene.

9. The method according to claim 4, wherein said diorganosiloxane (A) is selected from the group consisting of compounds represented by the structures

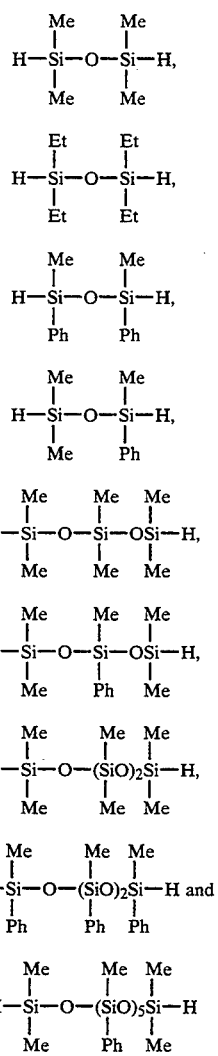

wherein Me and Ph represent methyl and phenyl radicals, respectively.

10. The method according to claim 9, wherein said unsaturated compound (B) is selected from the group consisting of acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne and 5-decyne.

11. The method according to claim 1, wherein $m=0$.

12. The method according to claim 1, wherein said catalyst (C) is a platinum catalyst.

13. The method according to claim 3, wherein said catalyst (C) is a platinum catalyst.

14. The method according to claim 4, wherein $m=0$.

15. The method according to claim 4, wherein said catalyst (C) is a platinum catalyst.

* * * * *